Dec. 23, 1941.          J. L. HAMILTON                2,266,968
                      LUBRICATED BEARING
                   Filed Nov. 6, 1939              2 Sheets-Sheet 1

INVENTOR:
JAMES L. HAMILTON
BY
Roy M. Eilers
ATTORNEYS.

Dec. 23, 1941. J. L. HAMILTON 2,266,968
LUBRICATED BEARING
Filed Nov. 6, 1939 2 Sheets-Sheet 2

INVENTOR:
JAMES L. HAMILTON
BY
Roy N. Eilers
ATTORNEYS.

Patented Dec. 23, 1941

2,266,968

UNITED STATES PATENT OFFICE 2,266,968

LUBRICATED BEARING

James L. Hamilton, Kirkwood, Mo., assignor to Century Electric Company, St. Louis, Mo., a corporation of Missouri Application November 6, 1939, Serial No. 302,982

1 Claim. (Cl. 308—132)

This invention relates to improvements in lubricated bearings. More particularly the invention relates to improvements in lubricated bearings which are made of porous metal. It is an object of the invention to provide a simple but efficient bearing made of porous material.

Porous metal bearings have been used for some time in connection with shafts which rotate at high speeds, and it has been found that bearings of this type are very efficient when saturated with oil. The saturation of the porous metal with oil causes oil to permeate the bearing metal, to contact the shaft on all sides, and to envelope it with a fine film of lubricant. The film of oil around the shaft prevents metal to metal contact between the shaft and the bearing. This avoids the many objections which are had to metal-to-metal contact such as excessive frictional resistance to the rotation of the shaft, excessive wear of the bearing surfaces, excessive heating of the bearing, and low efficiency of the bearing. Although porous bearings can be used to advantage on shafting, there are objections to their use. One objection to the use of porous bearings which are saturated with oil is that the bearings tend to permit oil to leak along the shaft and out of the bearing. This oil leakage results from the porous nature of the bearing and the abundant supply of oil used with the bearing. The oil leakage not only wastes lubricant but necessitates frequent oiling of the bearing. The loss of oil makes the bearing inefficient and expensive to operate and the frequent oiling required makes the operation of the bearing bothersome. If the tendency to permit oil to leak from the bearing can be overcome, the porous bearing may be used to advantage. It is, therefore, an object of the present invention to provide a porous metal bearing which may be saturated with oil without leaking.

Another objection to porous metal bearings is that they do not provide for a positive circulation of oil across the bearing surfaces. A positive circulation of oil continually presents a fresh supply of oil to the surfaces of the bearing. The provision of a fresh supply of oil to the bearing surfaces keeps oil moving across the surfaces and prevents the trapping of any part of the oil by the bearing. If the bearing were to trap any part of the oil, the continued rotation of the bearing would churn the oil and cause it to foam. The churning and foaming of oil causes it to break down and to lose some of its lubricating qualities. Since this oil is trapped by the bearing and no new oil is supplied, the only protection against wear which the bearing has at that spot is the churned oil. This oil has lost some of its lubricating properties and is, therefore, not an effective lubricant. The absence of an effective lubricant at that spot will cause excessive wear which in turn will cause the bearing to get hot. As the bearing gets hot, it will heat the rest of the oil in the bearing and cause it to lose some of its lubricating qualities. The loss of the lubricating qualities of the oil will increase the wear of the bearing surfaces and materially shorten the life of the bearing. This makes the bearing inefficient and expensive to maintain and operate. In view of the aforementioned reasons, it is obvious that the provision of a positive circulation of oil in a bearing lengthens the life of the oil and the bearing surfaces and thereby increases the efficiency of the bearing. The invention provides means to secure positive circulation of the oil through the bearing with all the advantages attendant thereto.

Still another objection to porous metal bearings is the pronounced tendency to leak oil when operated on shafts that are not horizontal. This type of bearing permits oil to leak out along the shaft rather freely when the shaft is tilted some fifteen or twenty degrees. This tendency to permit free leakage of oil seriously limits the usefulness of the bearing since it can be economically used on horizontal shafts only. It would be very advantageous to be able to use this type of bearing on tilted shafts if the oil leakage could be obviated. Bearings made in accordance with the principles expounded in this invention may be used on shafts which are set at all angles and can be used on vertical shafts. This results from oil-moving means which keep the oil from leaking out along the shaft. It is, therefore, an object of the invention to provide a bearing of porous material which may be operated efficiently on shafts which are set at all angles.

Other objects and advantages will be shown and described in the specification, drawings, and accompanying claim.

The invention is shown and described in the drawings and accompanying description in a preferred form but it is to be understood that the description and drawings do not limit the invention and that the invention will be defined by the accompanying claim.

Figure 1:
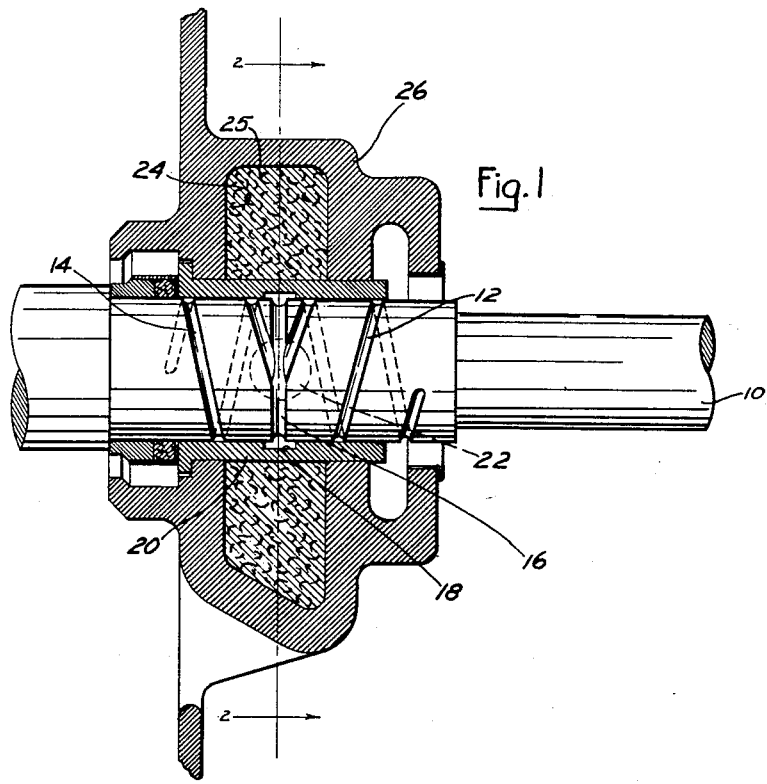
Fig. 1 is a longitudinal cross sectional view of a porous bearing and shaft construction made in accordance with the invention.
Figure 2:
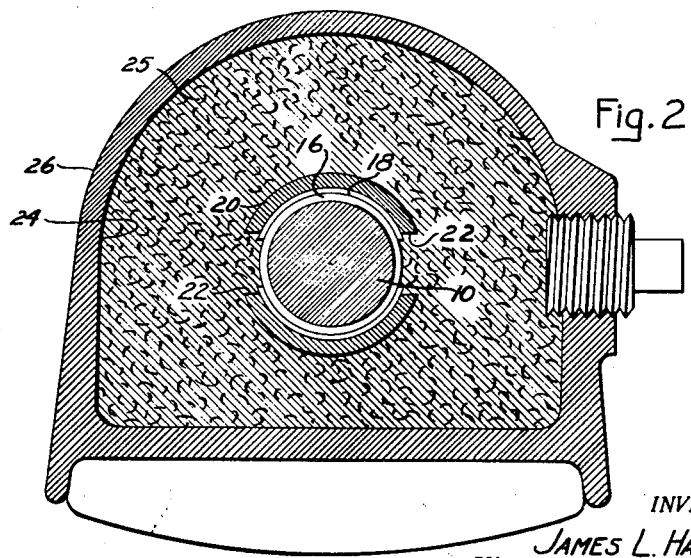
Fig. 2 is a cross sectional view of the shaft and bearing taken along plane 2—2 indicated in Fig. 1.

Referring to the drawings in detail, in Fig. 1 and Fig. 2, a rotatable shaft is represented by the number 10. Left-hand groove 12 and right-hand groove 14 may be machined in the shaft 10. At the junction of the left-hand groove 12 and the right-hand groove 14, a groove 16 may be machined in the shaft 10 and may be connected with both the left-hand groove 12 and the right-hand groove 14. In close proximity to the groove 16 in the shaft 10, is a groove 18 in the bearing 20. The groove 16 in the shaft 10 and the groove 18 in the bearing 20 are so machined that the two together form a chamber. An opening 22 in the bearing 20 may be made which will connect the groove 18 with the oil reservoir 24. The oil reservoir 24 may be filled with an oil absorbent material 25 saturated with oil if desired, although this is not necessary to the efficient operation of the bearing. The provision of an oil reservoir for use with the bearing permits the storage of quantities of oil therein. As a result, the bearing does not require much attention and may be operated for long periods of time without the addition of oil. The porous bearing 20 is held in place by bearing frame 26 which encloses reservoir 24.

The grooves in the shaft 10 are so designed that the rotation of the shaft 10 will cause a relative motion of the left-hand groove 12 and right-hand groove 14 toward each other. Since the porous bearing 20 is surrounded by an oil-filled reservoir 24, oil will pass through the bearing 20 onto the shaft 10. The rotation of the shaft 10 will cause the left-hand and right-hand grooves 12 and 14 to collect the oil on the shaft which is in excess of the amount required by the bearing surfaces. The oil which is collected in the left-hand and right-hand grooves 12 and 14 in the shaft 10, moves along the grooves 12 and 14 toward the groove 16. This movement of oil toward the center of the bearing 20 permits more oil to flow through the porous material at the ends of the bearing 20. The rotation of the grooved shaft 10 creates a positive circulation of oil which continually presents a fresh supply of oil to the bearing surfaces and removes from the bearing surfaces the fine metal particles which are worn away by the operation of the bearing. These small particles of metal, if not removed from the bearing surfaces, will act as abrasives and cause excessive wear of the bearing surfaces. The positive circulation of oil through the bearing also prevents any part of the oil from being trapped in the bearing. The trapping of oil in a bearing causes heating of the bearing and the breakdown of the oil. The design of bearings made in accordance with this invention insures a positive circulation of oil through the bearing and this not only provides a means for cooling the bearing but also provides economical lubrication.

The oil which is collected in the left-hand and right-hand grooves 12 and 14 is moved to the center of the bearing 20 by the rotation of the shaft 10 and enters the chamber formed by the groove 16 in the shaft 10 and the groove 18 in the bearing 20. The rotation of the grooved shaft 10 and resultant movement of oil to the center of the bearing 20 exerts pressure on the oil in the chamber formed by grooves 16 and 18. The pressure exerted on the oil forces it out of the chamber through the opening 22 into the oil reservoir 24. If desired an oil absorbent material 25 may be stored in the oil reservoir 24 and the oil forced through the opening 22 would pass through the oil absorbent material 25. The passage of the oil through the porous material of which the bearing 20 is made, and the passage of the oil through the oil absorbent material 25, filters the oil and removes any adulterant materials as well as the small particles of metal ground off of the bearing surfaces. This filtering action prolongs the life of the bearing by removing harmful materials from the oil.

In the preferred form of the invention shown in Fig. 1 and Fig. 2, an opening 22 has been provided in the bearing sleeve to permit the oil to flow easily from the grooves in the shaft into the reservoir 24. This promotes the free flow of oil through the bearing but it is not an essential feature of the invention since a circulation of oil may be had without the provision of such an opening. This is possible because of the porous character of the bearing material. The pressure created by reason of the flow of oil to the center of the bearing will force the oil at the center of the bearing to pass through the porous material of the bearing into the reservoir 24. Such a device would give a double filtering action by passing the oil through the porous material twice every time it completes a circuit of the lubrication channels in the bearing.

The movement of oil into the reservoir and the mixing with the other oil in the reservoir permits the oil to cool. This keeps the bearing cool and prolongs the life of the oil used therein.

Figure 3:
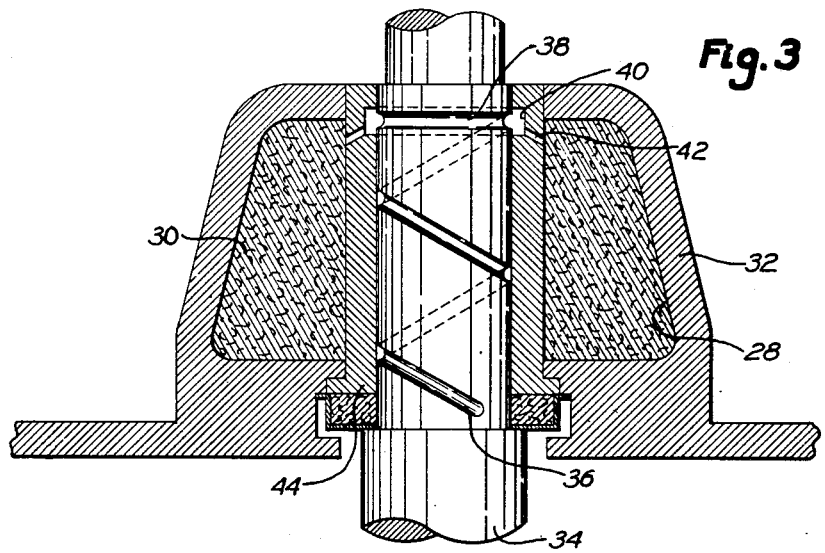
Fig. 3 is a longitudinal cross sectional view of a porous metal sleeve bearing designed for use with vertical shafting.

The oil-moving action of the grooves in the shaft resists oil leakage along the shaft 10, and permits the use of the bearing on shafting which is not horizontal. Ordinary bearings show a pronounced tendency to leak oil when operated in tilted positions. The grooves in the shaft 10, however, move the oil away from the ends of the bearing and thus keep the oil from leaking out along the shaft. In some of the installations now using this type of bearing, the shafts have been set at an angle of thirty degrees with the horizontal, and no leaking has occurred. This permits the use of the bearing on many different kinds of devices and makes the bearing a versatile one.

Where a well lubricated bearing is needed for a vertical shaft, a porous sleeve bearing could be used advantageously if the grooves on the lower side of the bearing were made longer or more numerous than the grooves on the upper side of the bearing. This is illustrated by the bearing shown in Fig. 3. In this form of the invention, only one groove is used to move the oil in the bearing, and gravity is depended upon to keep oil from flowing from the top of the bearing. A rotatable shaft 34 is enclosed by a sleeve of porous metal 44. The porous sleeve 44 is surrounded by an oil reservoir 28 which is mounted in the bearing frame 32. The shaft 34 has a groove 36 machined in it which leads to a groove 38 which is also machined in the shaft 34. The porous sleeve bearing 44 has a groove 40 machined in it which cooperates with groove 38 in the shaft 34 to form a chamber. An opening or passageway 42 in the sleeve 44 connects the chamber with the oil reservoir 28. Oil absorbent material 30 may be stored in the oil reservoir 28 to distribute the oil along the surface of the sleeve 44 and to filter the oil passing through the reservoir. When the device is operated, the groove 36 will act to move the oil upward toward the chamber formed by the grooves 38 and 40. This movement of oil to the top of the bearing encourages the movement of oil through the lower end of the bearing and provides an adequate supply of oil to the bearing surfaces. The oil collected in the groove 36 is forced into the grooves 38 and 40 and collects there. As the shaft continues to rotate, a pressure of oil will be built up in the grooves 38 and 40 and will force the oil through the passageway 42 into the oil reservoir 28. This provides a positive circulation of oil through the bearing with all of the advantages attendant thereto. Although only one groove has been shown, two or more grooves may be used and the length of these grooves varied to better adapt the bearing to the needs of the shafting and the work which it must do.

Figure 4:
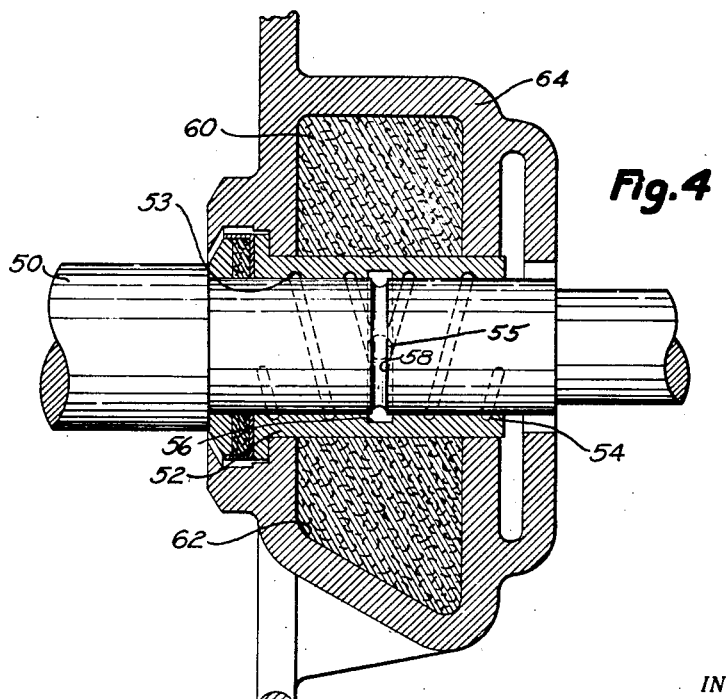
Fig. 4 is a cross sectional view of an optional form of the invention.

In Fig. 4 is shown an optional form of the invention. A rotatable shaft 50 is enclosed by a porous metal sleeve bearing 52 which is mounted in the bearing frame 64. Also enclosed by the bearing frame 64 is an oil reservoir 62 which is situated in close proximity to the porous metal sleeve 52. Machined in the shaft 50 is a groove 58 which cooperates with a groove 56 in the bearing sleeve to form a chamber. Left-hand and right-hand grooves 53 and 54 are machined in the bearing sleeve and are connected to the groove 56. An opening 55 in the sleeve bearing 52 connects the groove 56 with the oil reservoir 62. Oil absorbent material 60 may be placed in the oil reservoir 62 and filled with oil. The use of the oil reservoir makes it unnecessary to replenish the supply of oil frequently, and makes the bearing a more efficient one. The rotation of the shaft 50 causes the oil surrounding the shaft to rotate. As the oil rotates, it contacts the grooves 53 and 54 and is forced to move to the center of the bearing. As the oil continues to move to the center of the bearing, a pressure is exerted on it and it is forced into the oil reservoir through the opening 55. This provides a positive circulation of oil through the bearing and affords the advantages which such a circulation can give.

While a preferred form of my invention has been shown and described, it is obvious that there are many forms which may also be used without altering the scope of the invention. For example, the grooves might be machined on a sleeve which would be attached to the shaft and fitted inside a porous bearing. It also might be possible to machine cuts or a number of unconnected grooves in the metal to cause a flow of oil along the shaft, instead of machining grooves in the shaft or bearing. These and other forms of the invention are merely adaptations of the preferred form shown and described in this application and fall within the scope of the invention. By use of this invention, a simple and efficient bearing can be made which will have a long life and will not require attention.

What I claim is:

A lubricated horizontal shaft bearing comprising a closed lubricating chamber having aligned openings through its side walls, a bearing sleeve of porous material fitted in said openings and passing through said chamber, said sleeve having an internal annular groove therein approximately midway between the ends thereof and an opening in one side thereof substantially midway between the top and bottom of said bearing and connecting said groove horizontally with the lubricating chamber, a shaft fitted in said sleeve bearing, said shaft having right and left hand spiral grooves in its surface, said spiral grooves merging into an annular groove in the shaft surface which lies in the same general plane as the annular groove in the inner surface of the porous sleeve and communicating therewith, lubricant absorbent material within said chamber and opening in the bearing sleeve, said absorbent material surrounding said sleeve in contact therewith for feeding lubricant therethrough onto said shaft and said spiral grooves returning excess lubricant from the shaft to said annular groove and horizontally through the sleeve opening to said chamber.

JAMES L. HAMILTON.